United States Patent [19]

Grau et al.

[11] Patent Number: 5,200,951
[45] Date of Patent: Apr. 6, 1993

[54] APPARATUS AND METHOD FOR TRANSMITTING MESSAGES BETWEEN A PLURALITY OF SUBSCRIBER STATIONS

[75] Inventors: Alfred Grau, Zurich; Max Loder, Bonstetten; Hanspeter Küpfer, Birmensdorf, all of Switzerland

[73] Assignee: Siemens-Albis AG, Zurich, Switzerland

[21] Appl. No.: 908,547

[22] Filed: Jun. 30, 1992

Related U.S. Application Data

[63] Continuation of Ser. No. 573,815, Aug. 28, 1990, abandoned.

[30] Foreign Application Priority Data

Sep. 12, 1989 [CH] Switzerland .................. 03326/89

[51] Int. Cl.$^5$ .................... H04M 3/56; H04Q 11/02
[52] U.S. Cl. .................................. 370/62; 370/124; 379/202
[58] Field of Search ............ 370/62, 110.1, 76, 124; 379/202, 204, 205, 206, 158

[56] References Cited

U.S. PATENT DOCUMENTS

| | | | |
|---|---|---|---|
| 3,342,944 | 9/1967 | Barbato et al. | 379/158 |
| 3,527,889 | 9/1970 | Nennerfelt | 379/204 |
| 4,219,699 | 8/1980 | Nilssen et al. | 379/204 |
| 4,339,816 | 7/1982 | Reed | 379/204 |
| 4,706,244 | 11/1987 | Watson et al. | 379/202 |
| 4,998,243 | 3/1991 | Kao | 370/62 |

FOREIGN PATENT DOCUMENTS 0078714 5/1983 European Pat. Off. .
2061670 5/1981 United Kingdom .

*Primary Examiner*—Douglas W. Olms
*Assistant Examiner*—H. Kizou
*Attorney, Agent, or Firm*—Sandler, Greenblum & Bernstein

[57] ABSTRACT

A method and apparatus for conducting a conference call among a plurality of subscriber stations. Each subscriber station contains a transmitter, a receiver, and an auxiliary receiver. An output of the auxiliary receiver can be selectively connected to an adding member that is located between a microphone and an input of the transmitter. The subscriber stations establishing the conference call connection form a transmission chain. Each subscriber station involved in the conference call, with the exception of the first subscriber station on the transmission chain, receive a user signal of a preceding subscriber station. The user signal of the preceding subscriber station is added to its own user signal to produce a compound signal that is transmitted to the next subscriber station on the transmission chain. A compound signal created in the last subscriber station of the transmission chain is supplied to the receiver of all the subscriber stations on the transmission chain. Each subscriber station can also function as a transition station to permit the making of a conference call to subscriber stations located on another transmission network. Various transmission mediums, such as a wireless system or a line-guided system, can be employed. If a line-guided transmission system is used, the transmitters and receivers of the subscriber stations are inductively coupled to the line.

33 Claims, 5 Drawing Sheets

APPARATUS AND METHOD FOR TRANSMITTING MESSAGES BETWEEN A PLURALITY OF SUBSCRIBER STATIONS

This application is a continuation of application Ser. No. 07/573,815, filed Aug. 28, 1990, now abandoned.

BACKGROUND OF THE INVENTION

1. Field of the Invention

The present invention is directed to an apparatus and method for transmitting messages between a plurality of subscriber stations. In particular, the present invention is directed to transmitting information between subscriber stations by means of modulated carrier signals. A subscriber station having a message transfer installation that is operated in accordance with this invention comprises a transmitter that is connected to a voice current circuit, the output of which is connected to a transmission path, and a receiver that is connected to an audio current circuit, the input of which is connected to the transmission path.

2. Discussion of Background and Other Information

A message transmission installation is disclosed in European Patent B1-0 078 714, in which subscriber stations communicate with each other by means of a two-wire line. The subscriber stations are electrically connected to the two-wire line so that information can be transferred over the two-wire line using a frequency-modulated carrier, a pair of predetermined frequencies being used for each transmission direction. In addition to the establishment of connections between two subscriber stations, this installation permits the establishment of conference call connections, in which two or more subscriber stations are simultaneously connected to each other.

In such connections, message transmissions on the two-wire line are not made using a carrier frequency band signal, but rather by the use of an unmodulated baseband signal. Such an arrangement has several disadvantages. For instance, such a system permits unauthorized persons to listen in on a conference call, simply by connecting their own subscriber stations to the line.

A second disadvantage of such a system is that it permits only one conference call at any one time.

Another disadvantage of such a system is that distant conference call participants sound weaker than those participants that are less distant.

SUMMARY OF THE INVENTION

Based on the foregoing, an object of the present invention is to develop a subscriber station system which does not have the disadvantages discussed above and which permits, in a simple manner, network overlapping, two-station and conference call connections, in addition to internal network connections. The means for connecting the subscriber stations to one another may be hardwired, wireless or a combination of the two.

In addition to permitting voice communications between two subscribers, subscriber stations constructed in accordance with the present invention also permit the establishment of conference call connections between a plurality of subscribers of a transmission network located on any frequency. Further, the present invention can be used without changes as a network transition point for connecting two or more subscribers of different transmission networks. In this way, a special interface is not required for connecting overlapping networks. If messages are line-guided from one subscriber station to another subscriber station, the subscriber stations are inductively coupled to the line so as to prevent the line wires from being damaged by a user. This consideration is extremely important in networks where subscribers frequently change their location, thus moving their equipment. Further advantages of the invention ensue from the following description.

The present invention achieves the above objectives by providing a method for transmitting information between a plurality of subscriber stations using selected modulated carrier frequencies, comprising the steps of:

forming a transmission chain of all participating subscriber stations;

establishing a connection for a simultaneous communication between at least three of the subscriber stations;

supplying all of the subscriber stations, except for a first subscriber station, with a user signal of a preceding subscriber station in the transmission chain;

adding in each subscriber station the user signal of the preceding subscriber station to its own user signal to produce a compound signal;

forwarding the compound signal to a subscriber station that is next on the transmission chain, wherein the compound signal that is generated in a last subscriber station of the transmission chain is supplied to all subscriber stations participating in the simultaneous communication connection; and transmitting compound user signals, between the subscriber stations, and the compound signal, generated in the last subscriber station and supplied to all the subscriber stations, on an available selected carrier frequency, which may be different for each compound signal.

In establishing the conference call, a received user signal from a preceding subscriber station is added to a subscriber station's own user signal.

The present invention also enables subscriber stations on different networks to exchange messages. In such a situation, at least one subscriber station belongs to a first transmission network, the remaining subscriber stations to be connected for a conference call belonging to a second transmission network. The first transmission network forms a first transmission chain, in which one subscriber station functions as a first network transition station. The first network transition station is interfaced to a second network transition station that belongs to a second transmission network that forms a second transmission chain. A receiver output of the first transition station is coupled to a transmitter input of the second transition station, while a transmitter input of the first transition station is coupled to a reveiver output of the second transition station. Further, a first data connection (also referred to as an auxiliary interface) provided on the first transition station is connected to a second data connection provided on the second transition station so as to permit the exchange of data information needed to perform an overlapping network conference call.

Another object of the present invention is to allow additional subscriber stations to be added to an existing conference call by inserting the additional subscriber station between the subscriber station that initiated the conference call and the subscriber station that is located ahead of it in the transmission chain.

Another object of the present invention is to enable a conference call in which the transmission quality of all the involved subscribing stations is sufficiently high so as to prevent bothersome signal degradation. This is accomplished by selecting a channel having a carrier frequency of the highest still available carrier frequency that can be accommodated on the network without the signal being attenuated to the point of producing an unsatisfactory signal. The signal strength of the signal is then tested by comparing it to a preset value. If the signal quality is insufficient to enable a good quality connection, another channel is selected and tested.

Another object of the present invention is to permit users to interface their subscriber station equipment to the network, without running the risk that the equipment may damage the network. Therefore, the present invention envisions that the receiver and transmitter of each subscriber station is inductively coupled to network.

Further, the present invention discloses a subscriber station for exchanging communications on a transmission chain having at least three stations, in which each subscriber station comprises:

a transmitter for modulating an audio signal;

means for placing the modulated signal onto the transmission chain;

a receiver for receiving audio signals intended for the station that are placed on the transmission chain; and an auxiliary receiver for receiving a compound carrier frequency signal, the compound carrier frequency signal being used to interconnect at least three subscriber stations so that a conference communication can occur.

In such a transmission system, the carrier frequency signal is selected from a plurality of different carrier frequency signals.

An auxiliary interface is provided in each subscriber station for interfacing one subscriber station located on one network to another auxiliary interface provided on an outside subscriber station that is located on a second network. The auxiliary interface is used to exchange switching data between the two networks that is used to identify which subscriber stations on the two networks are to engage in a conference communication.

A subscriber station message transmitting method is disclosed in the present invention for transmitting information between a plurality of subscriber stations that communicate using a plurality of modulated carrier frequencies, comprising the steps of:

establishing a connection for a simultaneous communication between at least three of the subscriber stations;

supplying all of the subscriber stations, except for a first subscriber station, with a user signal of a preceding subscriber station;

adding in each subscriber station the user signal of the preceding subscriber station to produce a compound signal;

forwarding the compound signal to a subscriber station that is next on a transmission chain, wherein the compound signal that is generated in a last subscriber station of the transmission chain is supplied to all subscriber stations participating in the simultaneous communication connection; and transmitting compound user signals, between the subscriber stations, and the compound signal, generated in the last subscriber station and supplied to all the subscriber stations, each on an available carrier frequency that is selected for having the highest respectively lowest useable frequency.

According to the present invention, the selected carrier frequency is tested to determine its signal quality. If it is determined that the signal quality of the selected carrier frequency is unacceptable, another carrier frequency is selected for testing. The newly selected carrier frequency that is chosen for testing will have a frequency that is slightly lower than the previously selected carrier frequency, which was found to be unacceptable. The carrier frequency that is selected is dependent upon the distance separating each subscriber station on the transmission chain. Thus, the frequency of the selected carrier frequency will generally have to be lowered as the distance of the subscriber stations increases, due to an attention of the carrier frequency on a selected transmission medium.

According to the present invention, a method for transmitting messages on a network that permits at least three stations to participate in a conference communication is disclosed, comprising the steps of:

modulating a user signal of a first subscriber station on a first carrier frequency signal;

transmitting the modulated first carrier frequency signal to a second subscriber station;

demodulating the transmitted modulated first carrier frequency signal at the second subscriber station so that an unmodulated base band signal is produced, a user signal of the second subscriber station being added to the base band signal so as to produce a compound user signal;

modulating the compound user signal on a second carrier frequency signal that differs from the first carrier frequency;

transmitting the modulated second carrier frequency signal to a conference leader subscriber station; and demodulating the transmitted modulated second carrier frequency signal at the conference leader subscriber station so as to produce a demodulated compound user signal, a user signal of the conference leader subscriber station being added to the demodulated compound user signal so as to produce a new compound user signal, the new compound user signal being modulated and transmitted on a third carrier frequency signal to the conference participating stations, the third carrier frequency signal differing from the first and second carrier frequency signals.

According to another feature of the present invention, a method is disclosed for adding an additional station to a communication chain involving at least a conference leader station and a first subscriber station, both of which are located on a first network, comprising the steps of:

establishing a communication link between the conference leader station and an outside station located on a second network via network transition stations;

transmitting a user signal of the outside station via the network transition stations to an auxiliary receiver of the conference leader station; and transmitting a compound user signal formed in the conference leader station to a receiver of each station involved in a conference communication, such that the conference leader station, the outside station and the first subscriber station form a new communication chain.

BRIEF DESCRIPTION OF THE DRAWINGS

The foregoing and other objects, features, and advantages of the invention will be apparent from the following more particular description of a preferred embodiment, as illustrated in the accompanying drawings in which reference characters refer to the same parts throughout the various views, and wherein.

DETAILED DESCRIPTION OF THE PREFERRED EMBODIMENTS

Figure 1:
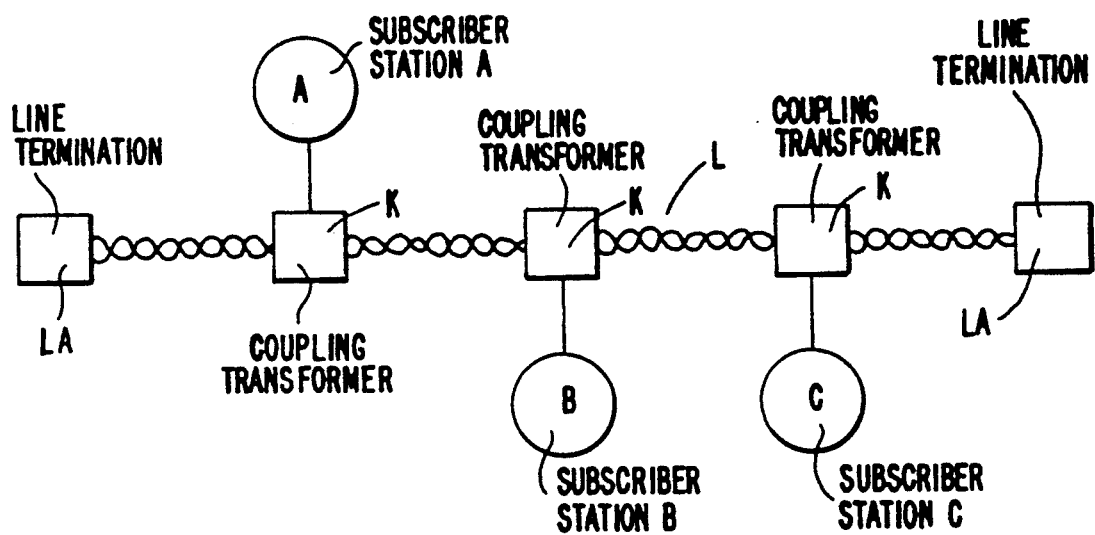
FIG. 1 illustrates a block diagram of a message transmission installation system having a plurality of subscriber stations according to a first embodiment of the invention, in which subscriber stations are connected using two-wire lines.

FIG. 1 illustrates a preferred embodiment of the present invention, in which several subscriber stations A, B, C are connected to a cabled two-wire line L. The two-wire line L is terminated at either end by a line termination LA. While FIG. 1 illustrates three subscriber stations, the present invention is not limited to such a configuration. That is, the present invention is applicable to any number of subscriber stations. The subscriber stations are inductively coupled to the line L, via a coupling connecting element, such as a coupling transformer K. Electrical power is supplied to each subscriber station either by the network or by batteries. The subscriber stations comprise a base device having an operating portion and associated electronics, and a handset having a microphone and a receiver. Particular details of the subscriber station will be discussed below.

Message transmission between various stations is accomplished using a frequency-modulated carrier signal of a predetermined frequency onto the two-wire line L. A pair of carrier frequencies is used in the case of a normal connection between two stations, i.e. one frequency is used for transmitting messages on a forward channel and one frequency is used to transmit messages on a return channel. If the forward and return channels are selected so that they have adjacent frequencies, the signals of both channels are similarly attenuated along the transmission path. When selecting a channel carrier frequency, one can proceed upon the assumption that line attenuations generally increases with increasing carrier frequencies. When selecting a channel carrier frequency, preferably the highest possible frequency that can be used to connect subscriber stations together while permitting a sufficient reception level of the carrier frequency over the distance that the message travels, should be used. Thus, preferably, high frequency carrier channels should be used to connect closely located subscriber stations, while low frequency carrier channels should be used to connect subscriber stations that are located over comparatively long distances.

Signaling between stations takes place in accordance with known FSK (frequency shift keying), techniques. That is, for signaling a station, a set carrier frequency is modulated in accordance with binary signaling information (such as a triggering of a call signal, subscriber's number, busy signal information, etc.). The carrier frequency of the signaling channel may be, for example, located below the carrier frequencies of the above-mentioned channels.

The signaling channel works in the form of a bus system with special access controls, such as is used with an Ethernet type network. The bus system is commonly used by all stations. Before a station can transmit a message, it must receive access approval by monitoring the transmission medium and determining whether a transmission is already taking place. If the bus system receives access approval, the transmission may proceed. After the message has been transmitted, the signaling channel is cleared, even if the same station has another message to send. This prevents temporary blocking of the signaling channel. If the signaling channel is not clear, the transmission attempt is aborted and access to the channel is repeated after a predetermined interval has passed. The message contains the information that is needed for signaling, such as the length of the message, the type and content of the message (for example, call, callback, clearing of a connection, etc.), the number of the called station and the number of the calling station.

Figure 2:
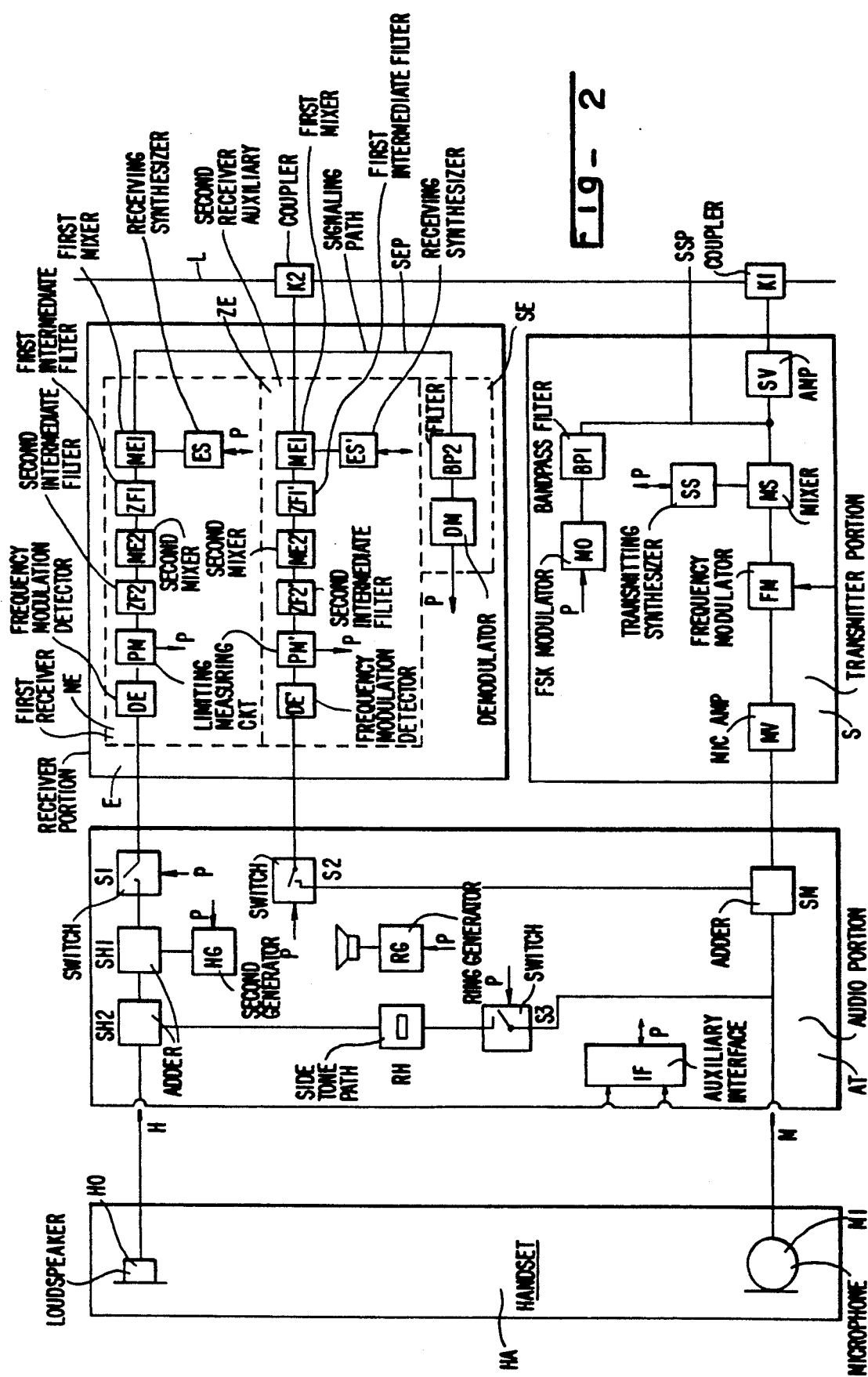
FIG. 2 illustrates a structure of a subscriber station used in the embodiment of FIG. 1.

FIG. 2 illustrates a block diagram of a subscriber station that is usable with the message transmission installation system of FIG. 1. Transmitter portion S, which is designed in a known way, has its output connected to line L, via the inductive coupling element K1. Receiver portion E, contains a first receiver NE and a second receiver ZE (hereinafter referred to as an auxiliary receiver), that is identical to the first receiver. The two receivers NE and ZE are constructed using standard superheterodyne receiver (superhet) techniques, which is known in the art. The inputs of the two receivers NE and ZE are connected together to the line L via an inductive connecting element K2. Additionally, a signaling receiving path SEP is connected to the input of the receiver portion E, while a signaling transmission path SSP is connected to the output of the transmitter portion S.

A programmable control device employing a microprocessor, not shown, controls the operations of the subscriber station. In FIG. 2, all parts of the station that are controlled by the control device have been provided with an arrow showing the letter P. The direction in which the arrow points indicates whether the signal flow is from or to the control device. The output of the receiver NE is connected, via switch S1, to loudspeaker HO in handset HA of the station. The output of the auxiliary receiver ZE is connected, via switch S2, to a first input of an adding member SM, while microphone MI of handset HA is connected to a second input of the adding member SM. The output of the adding member SM is connected to the input of the transmitter portion S.

When a connection is to be established, the other party is first called (rung up), via the signaling path SSP. The information received from the control device is transformed by an FSK modulator MO into an FSK signal having a predetermined center frequency. The signal is then filtered by a bandpass filter BP1. The resultant signaling message is inputted to a transmission amplifier SV, which amplifies the signal and couples it to the line L.

On the receiving end, the signaling message is filtered by a filter BP2 and coupled to a FSK demodulator DM, to generate demodulated information. The demodulated information is then supplied to the control device.

Signaling receiver SE is the only unit in the station that is in continuous operation. As soon as the signaling receiver SE receives signaling information, it activates the control device, which causes the remaining units of the station to be activated, so that the arriving signaling information can be processed.

To establish a connection, a calling subscriber first lifts his handset (or, alternatively, if the station is so designed, places his station into a hands-free mode of operation). Upon the receipt of a dial tone, the calling subscriber dials a desired number that corresponds to a subscriber to be called. The number is transmitted to the appropriate station, in the form of a call message, via the signaling channel. The station then reports it status. If the station is available, i.e. it is not busy, the calling station initiates the search for a suitable free transmission channel. The station starts with the still free transmission channel with the highest frequency by transmitting the corresponding carrier frequency, which is received in the receiver NE of the called station. The receiving level is checked by a limiting and measuring circuit PM. The station searching for a free channel determines the available, i.e., not occupied, channels by means of its measuring circuit PM.

The measurement results obtained by the measuring circuit PM is evaluated by the control device to determine whether the receiving level in a checked channel is sufficient to produce a sufficiently clear signal. If an adequate signal is produced, an appropriate report is given, via the signaling channel, to the calling station and the channel is considered to be occupied. Otherwise, the search procedure is repeated for the next lower and still available carrier frequency. After the forward channel has been secured, the station called determines the return channel, in the same way that the calling station determined the forward channel, again starting with the highest of the still free channel frequencies. If both channels are steady, the desired station is called. As soon as the called subscriber responds, the establishment of the connection is completed so that the conversation i.e., the transmission of user signals between the two subscribers can begin.

Figure 3:
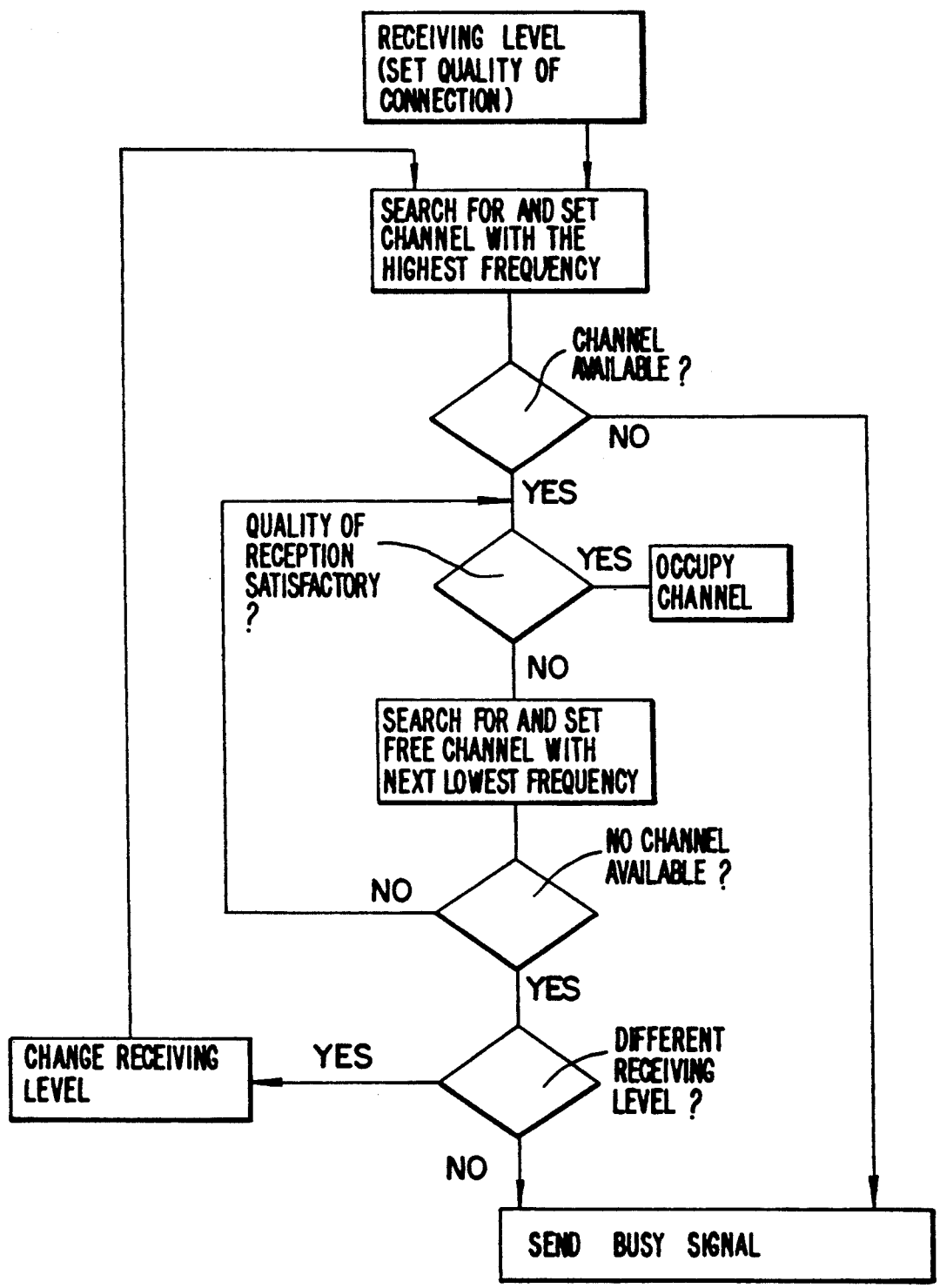
FIG. 3 illustrates a flowchart for selecting a free channel on the message transmission system.

FIG. 3 illustrates a flowchart showing the steps of searching for and selecting a free channel. Prior to the start of a channel search, a value is determined for a set receiving level, which determines the quality of the connection to be established. The measuring circuit PM provides a measurement value that corresponds to the actual receiving level. The control device then compares the measurement value to the set value. An advantageous improvement is shown in FIG. 3, in which not only one, but a plurality of different receiving levels are included in the channel search. If it is not possible to find a free channel in connection with a first set receiving level, another, for example, reduced (but, still satisfactory as far as clarity is concerned) receiving level is selected. The channel search is then repeated, again starting with the free channel having the highest frequency. A busy signal is transmitted to the calling subscriber only if no forward and return channels have been found after selecting all appropriate receiving levels.

In the speech mode, the microphone signal on the transmitting side is amplified by a microphone amplifier MV and then transmitted to a frequency modulator FM for frequency modulating a carrier frequency. Level conditions are set so that a specified frequency deviation results in a maximum signal level produced by the microphone. A subsequent bandpass filter, not shown in FIG. 2, restricts the frequency band to the required frequency modulation spectrum, which is actually infinitely stretched in regard to frequencies. The following mixer MS transfers the frequency modulated signal to an appropriate voice channel by means of a transmitting synthesizer SS that communicates with the control device. The transmitted signal is also passed through a transmission amplifier SV, which amplifies the signal and places it upon the line L.

In a two-way connection, that is, a connection between only two subscribers, only receiver NE is used on the receiving end. The auxiliary receiver ZE remains inactive. The auxiliary receiver ZE is only activated during a conference call connection, that is, only when three or more subscribers are connected together. The received signal reaches receiver NE via line L. The selected voice channel is then inputted to a first mixer ME1, so as to produce a first intermediate frequency signal (i.e., lower sideband signal), with a receiving synthesizer ES. A first intermediate frequency filter ZF1 receives the first intermediate frequency signal and removes the frequency carrier of the receiving synthesizer ES and the upper sideband signal. An output signal from the intermediate frequency filter ZF1 is inputted to a second mixer ME2. The second mixer ME2 converts the signal to a second intermediate frequency. A second intermediate frequency filter ZF2 accepts the second intermediate frequency signal to make the actual channel selection. Limiting-measuring circuit PM suppresses an amplitude modulation signal that is produced as the result of limiting the frequency band of the signal. In addition, the limiting-measuring circuit PM contains an analog level measuring device to measure the signal, the measurement result of which is supplied to the control device in a digitally converted way for use in selecting a voice channel. The signal outputted from the limiting-measuring circuit PM is then supplied to a frequency modulation detector DE.

A voice signal that is provided by the frequency modulation detector DE in the base frequency bond to an audio portion AT, via switch S1, is supplied to the loudspeaker HO in the handset HA. Switch S1 is closed only when the channel search is finished. An information sound generator HG provides information signals, such as a dial tone, a busy signal, etc., which are superimposed on the voice signal via an adding member SH1. Because all two-way connections in this configuration are four-wire connections and there is no transition from two-wire to four-wire, the side tone is missing. Thus, the tonal quality of the users are affected. Because the user would find this to be annoying, a side tone path RH is selectively connectable by activating switch S3. The side tone is superimposed on the received voice signal via a further adding member SH2. The volume of the loudspeaker HO is adjustable by means of a keyboard of the operating portion of the subscriber station. The signal for ringing up the station is provided by a ring generator RG.

Figure 4:
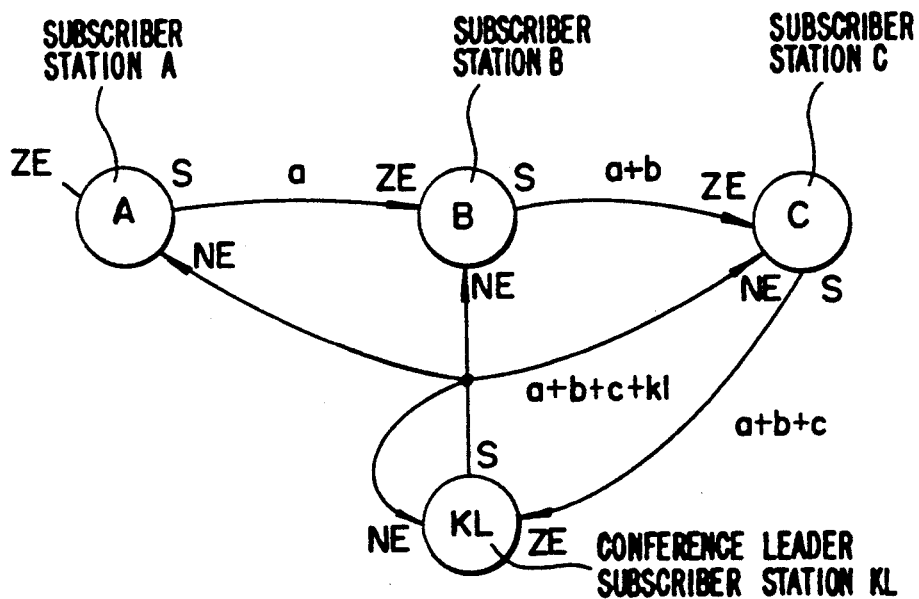
FIG. 4 illustrates a conference call connection that is placed on the system of FIG. 1.

FIG. 4 illustrates a conference call connection that is placed using the message transmission installation system of FIG. 1, in which several subscriber stations A, B, C and KL, of the type described above, are employed. A conference call is initiated by a callback connection with the subscriber who is to participate in the conference. The subscriber initiating the conference call establishes the callback by means of a normal two-way connection. The establishment of the callback connection takes place principally in the same way as that of a normal two-way connection.

First, assume a normal two-way connection between stations A and KL. If by arrangement of station KL, station B is to be included in the connection by means of a conference call, station KL first establishes a callback connection with station B. A requirement for this is the availability of a suitable forward and return channel. During the callback, station A remains in a hold state, in which it cannot accept any calls. During the establishment of the callback, the number of the waiting station A is transmitted to the callbacked station B. As soon as station B answers, subscriber KL operates a conference key switch on his station, whereupon the transmitting channel is switched off and a search for a free compound channel for the compound signal a+b+k1, formed in station KL and to be explained below, is initiated. In the following example, a compound channel corresponds to a channel carrier frequency selected for transmitting a compound user signal (such as, for example, a+b+k1), generated in the base frequency band in the last subscriber station of the transmission chain. If the search is successful, the channel is occupied by station KL.

Station KL reports the number of the compound channel to station B, which, in turn, reports the number of the compound channel to station A. In the course of the callback, the call number of station A is reported to station B by station KL. Station A then searches for and occupies a free transmission channel to station B. Station B sets its receiver NE to the compound channel and its auxiliary receiver ZE to the transmitting channel of station A. In the same way, station A sets its receiver NE to the compound channel and reports its readiness to station B. Finally, station KL sets its auxiliary receiver ZE to the transmitting channel of station B. Then, the connections between stations A and B, and B and KL are activated, the latter also setting its receiver NE to the compound channel.

In this way, the conference call between the three stations A, KL and B is accomplished. Subscriber KL, who initiated the conference call, becomes the conference leader. He can add further stations, for example station C, to the conference call connection in the same manner described above for adding station B. In this case, he again first contacts station C by callback, and the newest conference participant B is placed in the hold state. Operating the conference key switch triggers all the procedures required up to the entry of a desired subscriber into the conference call connection.

Subscriber stations that are newly entering the conference call connection are added in the sequence of their entry to the transmission chain, as shown in FIG. 4, between the respectively last (newest) station that is added to the conference call and station KL, which initiated the conference call. Thus, in FIG. 4, if another station, such as further station D, not shown, is to be included in the conference call, it would be added between stations C and KL. In this conference connection, the transmitting signal a of the preceding subscriber station A is supplied to the auxiliary receiver ZE of the newly added subscriber station B. The received transmitting signal a is added in subscriber station B to its own voice signal b and the compound signal a+b is transmitted to the next-following subscriber station C. Station C in turn receives the compound signal a+b in its auxiliary receiver ZE and forms a compound signal a+b+c, which reaches auxiliary receiver ZE of subscriber station KL, which initiated the conference call. The compound signal a+b+c+k1 formed in station KL is now routed to its own receiver NE, as well as to receivers NE of all the stations A, B and C, so that it reaches all the loudspeakers HO of the stations.

In contrast to the previously described channel selection in accordance with FIG. 3, when selecting the compound channel, a carrier frequency as low as possible is needed for the compound signal a+b+c+k1 emitted by station KL, so that there will be no signal attenuation between stations that are far apart from each other, which might result in an undesired diminishing of the sound quality of the connection. It is noted that the auxiliary receiver ZE of the first station A of the transmission chain remains inactive. Summing of the signal received by a subscriber station with its own signal takes place in the unmodulated base-frequency bond. This is accomplished by operating switch S2 (shown in FIG. 2), which is controlled by the control device, to pass the signal emitted by demodulator DE' at the output of auxiliary receiver ZE to adding member SM, where it is added to the signal from microphone MI. The compound signal formed in the adding member SM reaches the transmitting portion S, where it is modulated on a carrier frequency, in the manner previously described, and passed onto line L. A separate carrier frequency is assigned to each one of the compound signals emitted by a subscriber station. In the preferred embodiment, the maximum number of stations which can be connected to a conference call corresponds to the number of available carrier frequencies.

If a subscriber taking part in the conference call (for example, subscriber C in FIG. 4) decides to leave the conference connection, the subscriber must first activate an appropriate key at the subscriber's station. Station C reports to the station following in the chain, which, in the present example is station KL, the call number of station B located ahead of it in the chain. Following receipt of this call number, station KL sends a "close conference chain" command to station B, i.e., a signal that a connection must be established between stations B and KL. Accordingly, a search for a suitable free channel is made between stations B and KL and is activated as needed between the transmitter output of station B and the input of the auxiliary receiver ZE of station KL. The compound signal a+b+k1 generated by station KL is now only supplied to stations A and B, and station C is disconnected.

If the establishment of a connection between stations KL and B is unsuccessful, it may be possible to establish a connection between station KL and station A. In this way, it is ensured that the conference call connection does not completely fail, in spite of possible difficulties after one subscriber has left it, and the conference call is at least partially maintained between, in the present example, subscribers A, KL, and other subscribers not previously mentioned.

Figure 5:
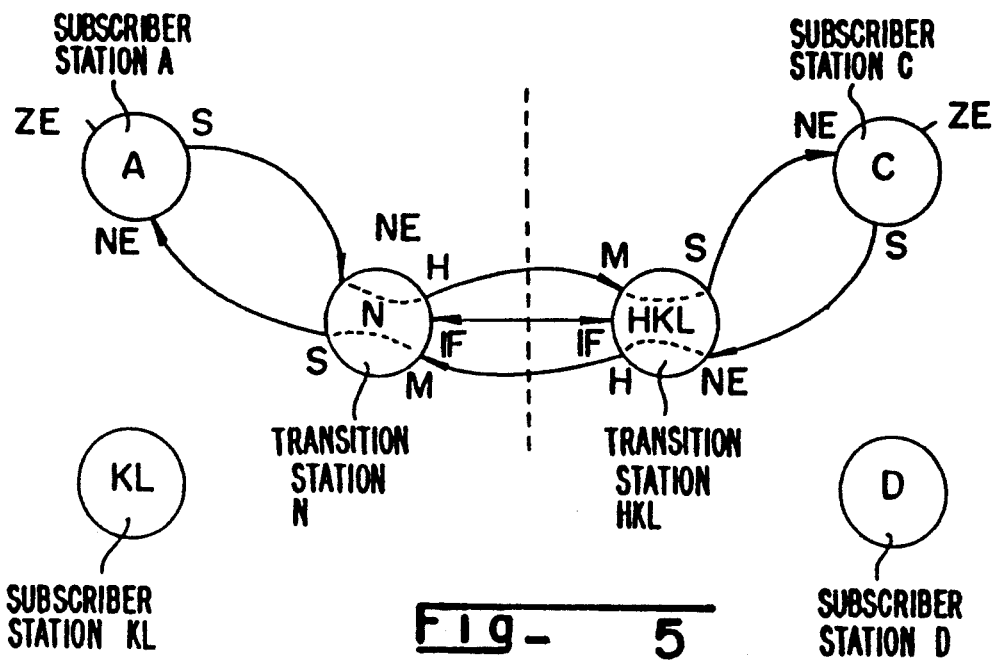
FIGS. 5-7 illustrate various network overlapping connections performed on the system of FIG. 1.
Figure 6:
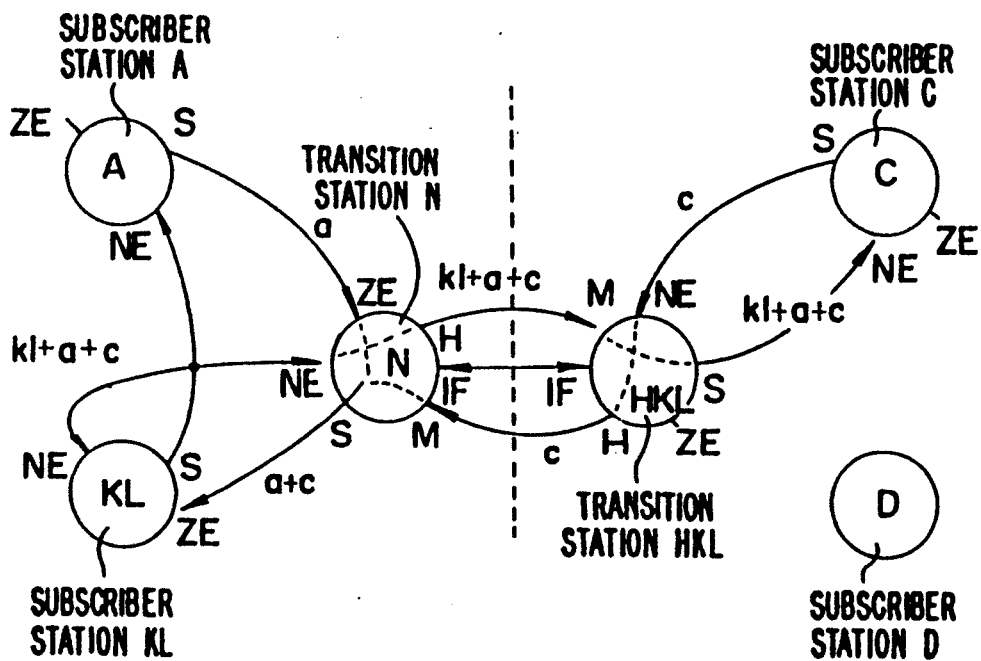
Figure 7:
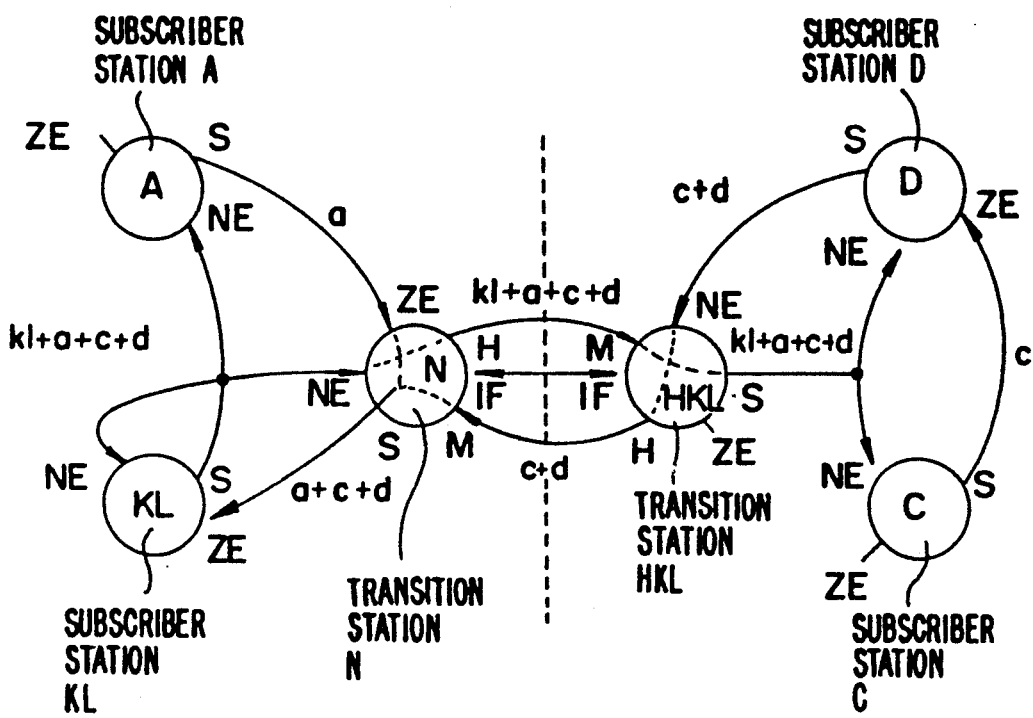

In FIGS. 5-7, overlapping network connections (two-way or conference call connections) are illustrated. Therefore, the subscribers participating in a connection are located in different information networks. In the illustrated examples, subscriber stations A and KL are part of a first network, the original net, and subscriber stations C and D are part of a second network, herein referred to as an outside network. Two unattended stations (i.e., without subscribers), such as subscriber stations N and HKL, are used as transition points between the two networks, loudspeaker connection H of which is connected with microphone connection M of the other stations. The two transition stations N and HKL act the same as normal stations that are operated by a subscriber, and correspond to the station design illustrated in FIG. 2.

It is noted that all subscriber stations have an auxiliary interface IF that is connected to the control device of the stations. The auxiliary interface IF comprises, for example, a bi-directional, serial interface. The auxiliary interface IF of the stations that are used as transition stations are connected together for facilitating the transmission of switching data that is necessary for performing a network overlapping operation. The switching data includes signaling information for establishing the connection, as well as information regarding system status changes. Received reports are processed as keyboard events, i.e., signaling information arriving at a transition point via the auxiliary interface IF is processed by the control device in the same way as if it had been entered by way of a keyboard by the operator of a normally operating subscriber station. In this way, remote control of the transition station HKL, by the transition station N, is made possible in the embodiments of FIGS. 5-7.

The establishment of a network overlapping connection between two stations will now be described below with reference to FIG. 5. Assume that station A of the original network wants to initiate a call to station C, which is on the outside network. After activating his station, the caller dials the number of station C. The dialed number comprises two parts; a first part which identifies the corresponding network transition, and a second part that identifies the desired station on the outside network. As described above, a connection is established between station A and transition station N. The transition station N is rung up, which, because of this, activates transition station HKL of the outside network, via the auxiliary interface IF. Transition station HKL reports its readiness to transition station N by returning a dial tone, which then reaches calling station A. Thereupon, the part of the number that identifies station C, which was dialed by station A, is transmitted to transition station N. Station N forwards it through the auxiliary interface IF to transition station HKL, at which point the dial tone is canceled. Transition station HKL uses the forwarded number to enable an automatic, normal establishment of a connection with station C on the outside network. As soon as station C answers, the connection between the transition station HLK and station C changes to the voice mode and a conversation between the two stations can proceed. If the called station C were on another outside network, which could be reached through the first identified outside network, establishment of a connection would proceed as described above, by means of another transition station that would connect the two outside networks to the original network.

In FIG. 6, a connection is shown in which a station C of the outside network is connected in a conference call configuration with stations A and KL of the original network. First, a normal two-way connection between stations A and KL is established. Stations A and KL may be members of the same network, or may be from different networks. If station KL wants to include station C, thus forming a three subscriber conference call, the caller releases his connection with station A and establishes a network overlapping callback connection with station C. That is, the connection with station A is placed on a hold state. After the callback connection has been established, the station KL user operates his conference key switch. Station KL disables its transmitting channel in the callback connection, searches for a free compound channel and captures it. The number of the compound channel is reported to transition station N, which in turn, reports the number of the compound channel to station A. The call number of station A was reported to transition station N by station KL in the course of the callback. Receiver NE of station N is now set to the compound channel. In the same way, the receiver NE of station A is set to the compound channel and station A reports to transition station N that it is ready. Furthermore, auxiliary receiver ZE of station KL is set to the transmitting channel of station N. Thereupon, the connections between stations A and N, and N and KL are established. It is noted that receiver NE of station KL is also set to the compound channel. Thus, a desired three subscriber conference call between stations A, KL and C is established.

FIG. 7 illustrates another example of a network overlapping conference call connection, in which two subscriber stations (i.e., stations N and HKL) act as transition stations. In contrast to the example shown in FIG. 6, two subscriber stations C and D of an outside network are included in a conference call with stations A and KL. Transition station N has been connected in a conference call configuration with stations A and KL of the original network, in the manner described above with respect to FIG. 4. Transition station N processes the message signal in the same way as a normally operated station. The compound signal kl+a+c+d received by receiver NE of station N reaches its loudspeaker connection H, and from there, microphone connection M of the transition station HKL on the outside net. Furthermore, compound signal a+c+d is formed in transition station N. This signal comprises signal a received in its own auxiliary receiver ZE and compound signal c+d that arrives from the outside network via microphone connection M.

Transition station HKL acts as an auxiliary conference leader to remotely perform the conference control on the outside network. Transition station HKL transmits message signal a+c+d+kl, arriving from the original network, as a compound signal to the outside network, the compound signal reaching receivers NE of all the included stations (i.e., stations C and D) of the outside network. Transition station HKL transmits, via its loudspeaker connection H, compound signal c+d that is received in its receiver NE to microphone connection M of station N on the original network. The establishment of such a conference call takes place in the same manner described above with respect to FIG. 6.

While the invention has been particularly shown and described with reference to a preferred embodiment thereof, it is understood by those skilled in the art that various alterations in form and detail may be made without departing from the spirit and scope of the invention as defined by the claims. For instance, while the present invention has been described with respect to a line-guided message transmission system, the invention is equally applicable to wireless transmission (i.e., radio) systems. In a wireless transmission system, each station would have a transmitting end and a receiving end that would be connected to an antenna, and suitable carrier frequencies would be provided for the transmission channels and the signaling channel.

What is claimed is:

1. A method for transmitting information between a plurality of subscriber stations using selected modulated carrier frequencies, comprising the steps of:
   forming a transmission chain of all participating subscriber stations;
   establishing a connection for a simultaneous communication between at least three of the subscriber stations;
   supplying all of the subscriber stations, except for a first subscriber station, with a user signal of a preceding subscriber station in the transmission chain;
   adding in each subscriber station the user signal of the proceeding subscriber station to produce a compound signal;
   forwarding the compound signal to a subscriber station that is next on the transmission chain, wherein the compound signal that is generated in a last subscriber station of the transmission chain is supplied to all subscriber stations participating in the simultaneous communication connection; and
   transmitting compound user signals, between the subscriber stations, and the compound signal, generated in the last subscriber station and supplied to all the subscriber stations, on an available selected carrier frequency that is different for each compound signal.

2. The method of claim 1, wherein during the step of establishing a simultaneous connection between the at least three subscriber stations, at least one subscriber station belongs to a first transmission network, remaining subscriber stations belonging to a second transmission network, the first transmission network forming a first transmission chain in which one subscriber station functions as a first network transition station, the first network transition station being interfaced to a second network transition station that belongs to the second transmission network that forms a second transmission chain, a receiver output of the first transition station being selectively coupled to a transmitter input of the second transition station, a transmitter input of the first transition station being selectively coupled to a receiver output of the second transition station, and wherein a data connection between the first transition station and the second transition station is selectively connected.

3. The method of claim 1, wherein the step of including a newly desired subscriber station into a conference call connection comprises inserting the newly desired subscriber station between the subscriber station that initiated the conference call and the subscriber station that is located ahead of it in the transmission chain.

4. The method of claim 1, wherein the step of adding the user signal received from the preceding subscriber station to a subscriber stations's own user signal takes place in a base band frequency band.

5. The method of claim 1, wherein the step of selecting the carrier frequency for the transmission of the user signals between the subscriber stations involves selecting a channel having a carrier frequency that can be accommodated on the network without being attenuated to the point of producing an unsatisfactory signal.

6. The method of claim 5, wherein the step of transmitting the compound signal that is generated by a last subscriber station and transmitted to all subscribers on the transmission chain utilizes a frequency carrier signal that is as low as possible.

7. The method of claim 5, wherein the step of transmitting the user signals between two subscriber stations on the transmission chain utilizes a frequency carrier signal that is as high as possible.

8. The method of claim 5, wherein the step of searching for a channel to be selected comprises using a plurality of receiving levels to determine the transmission quality of a selected channel.

9. The method of claim 6, wherein the step of searching for a channel to be selected comprises using a plurality of receiving levels to determine the transmission quality of a selected channel.

10. The method of claim 7, wherein the step of searching for a channel to be selected comprises using a plurality of receiving levels to determine the transmission quality of a selected channel.

11. The method of claim 1, further comprises the step of using a commonly assigned channel having a specially selected carrier frequency for signaling the subscriber stations.

12. The method of claim 1, further comprises the step of inductively coupling each receiver and transmitter of each subscriber station to a transmission line that forms the transmission chain.

13. The method of claim 1, wherein a microphone current circuit is connected to an input of a transmitter of each subscriber station, an output of the transmitter being connected to a transmission path, a receiver of each subscriber station being connected to a loudspeaker circuit, an input of the receiver being connected to the transmission path, further comprising providing an auxiliary receiver for each subscriber station, an input of the auxiliary receiver being connected to the transmission path, while an output of the auxiliary receiver is connected to an adding member that is inserted between the microphone current circuit and the input of the transmitter.

14. The method of claim 13, wherein the construction of the receiver and the auxiliary receiver of each subscriber station are substantially identical.

15. The method of claim 13, further comprising the step of providing an auxiliary interface in each subscriber station for transmitting switching data to other subscriber stations.

16. The method of claim 14, further comprising the step of providing an auxiliary interface in each subscriber station for transmitting switching data to other subscriber stations.

17. The method of claim 2, wherein the step of including a newly desired subscriber station into a conference call connection comprises inserting the newly desired subscriber station between the subscriber station that initiated the conference call and the subscriber station that is located ahead of it in the transmission chain.

18. The method of claim 2, wherein the step of adding the user signal received from the preceding subscriber station to a subscriber station's own user signal takes place in a base band frequency band.

19. The method of claim 3, wherein the step of adding the user signal received from the preceding subscriber station to a subscriber station's own user signal takes place in a base band frequency band.

20. A method for transmitting messages on a network that permits at least three stations to participate in a conference communication, comprising the steps of:
   modulating a first carrier signal by a user signal of a first subscriber station;
   transmitting the modulated first carrier signal to a second subscriber station;

demodulating the transmitted modulated first carrier signal at the second subscriber station so that an unmodulated base band signal is produced, a user signal of the second subscriber station being added to the base band signal so as to produce a compound user signal;

modulating a second carrier signal that differs from the first carrier signal by the compound user signal;

transmitting the modulated second carrier signal to a conference leader subscriber station; and demodulating the transmitted modulated second carrier signal at the conference leader subscriber station so as to produce a demodulated compound user signal, a user signal of the conference leader subscriber station being added to the demodulated compound user signal so as to produce a new compound user signal, the new compound user signal modulating a third carrier signal and being transmitted to the conference participating stations, the third carrier signal differing from the first and second carrier signals.

21. The method of claim 20, wherein at least one of the subscriber stations is located on a second network.

22. The method of claim 20, further comprising the step of adding an outside station, that is located on a second network, to the conference communication.

23. A subscriber station for exchanging communications on a transmission chain, having at least three subscriber stations, in which one of said at least three subscriber stations that initiates a conference communication between said at least three subscriber stations acts as a conference leader station, comprising:

a transmitter for modulating a carrier signal by a speech signal;

means for placing said modulated carrier signal onto said transmission chain;

a receiver for receiving modulated carrier signals intended for said subscriber station that are placed on said transmission chain; and a further receiver for receiving a carrier signal modulated by a compound signal, said compound signal being generated in said conference leader station and being used to interconnect said at least three subscriber stations so that a conference communication can occur.

24. A method for transmitting information between a plurality of subscriber stations that communicate using a plurality of modulated carrier frequencies, comprising the steps of:

establishing a connection for a simultaneous communication between at least three of the subscriber stations;

supplying all of the subscriber stations, except for a first subscriber station, with a user signal of a preceding subscriber station;

adding in each subscriber station the user signal of the preceding subscriber station to the user signal of said each subscriber station to produce a compound signal;

forwarding the compound signal to a subscriber station that is next on a transmission chain, wherein the compound signal that is generated in a last subscriber station of the transmission chain is supplied to all subscriber stations participating in the simultaneous communication connection; and transmitting compound user signals, between the subscriber stations, and the compound signal, generated in the last subscriber station and supplied to all the subscriber stations, each on a selected highest respectively lowest available usable carrier frequency.

25. The method of claim 24, further comprising the step of testing the selected carrier frequency to determine its signal quality.

26. The method of claim 25, further comprising the step of selecting another carrier frequency for testing if it is determined that the signal quality of a previously selected carrier frequency is unacceptable, the another carrier frequency having a frequency that is slightly lower than the previously selected carrier frequency.

27. The method of claim 26, wherein the step of establishing a simultaneous connection between the at least three subscriber stations comprises having at least one subscriber station belong to a first transmission network, while remaining subscriber stations belong to a second transmission network, and further comprising forming a first transmission chain from the first transmission network, in which one subscriber station functions as a first network transition station, and interfacing the first network transition station to a second network transition station that belongs to a second transmission network that forms a second transmission chain.

28. The method of claim 27, further comprising the steps of:

coupling a receiver output of the first transition station to a transmitter input of the second transition station;

coupling a transmitter input of the first transition station to a receiver output of the second transition station; and connecting a first data connection of the first transition station to a second data connection of the second transition station.

29. The method of claim 28, further comprising the step of inductively coupling each receiver and transmitter of each subscriber station to a transmission line that forms the transmission chain.

30. The method of claim 24, wherein the step of establishing a simultaneous connection between the at least three subscriber stations comprises having at least one subscriber station belong to a first transmission network, while remaining subscriber stations belong to a second transmission network, and further comprising forming a first transmission chain from the first transmission network, in which one subscriber station functions as a first network transition station, and interfacing the first network transition station to a second network transition station that belongs to a second transmission network that forms a second transmission chain.

31. The method of claim 30, further comprising the steps of:

coupling a receiver output of the first transition station to a transmitter input of the second transition station;

coupling a transmitter input of the first transition station to a receiver output of the second transition station; and connecting a first data connection of the first transition station to a second data connection of the second transition station.

32. The method of claim 24, wherein the step of selecting a carrier frequency is dependent upon a distance between the subscriber stations on the transmission chain.

33. A method for adding an outside station of a second network to a communication chain involving at least a conference leader station and a first subscriber station, both of which are located on a first network, comprising the steps of:

establishing a callback connection as a communication link between the conference leader station and the outside station via network transition stations while putting the first subscriber station on hold;

enabling the outside station and the first subscriber station to transmit a user signal to the network transition station of the first network which sends a corresponding compound signal to an auxiliary receiver of the conference leader station; and enabling the outside station and the first subscriber station to receive a compound signal transmitted by the conference leader station, said compound signal comprising the user signals of all stations, such that the conference leader station, the outside station and the first subscriber station form a new communication chain.

* * * * *